(12) United States Patent
DeVoe et al.

(10) Patent No.: US 8,293,061 B2
(45) Date of Patent: Oct. 23, 2012

(54) LOW TEMPERATURE POLYMER BONDING USING UV/OZONE SURFACE TREATMENT

(75) Inventors: Donald Lad DeVoe, Bethesda, MD (US); Chia-Wen Tsao, Columbia, MD (US)

(73) Assignee: University of Maryland College Park, College Park, MD (US)

( * ) Notice: Subject to any disclaimer, the term of this patent is extended or adjusted under 35 U.S.C. 154(b) by 456 days.

(21) Appl. No.: 12/399,178

(22) Filed: Mar. 6, 2009

(65) Prior Publication Data
US 2009/0227755 A1 Sep. 10, 2009

Related U.S. Application Data

(60) Provisional application No. 61/034,273, filed on Mar. 6, 2008.

(51) Int. Cl.
*C08J 3/28* (2006.01)
*B29C 65/14* (2006.01)
*B29C 65/00* (2006.01)
*B32B 37/06* (2006.01)
*B32B 37/00* (2006.01)

(52) U.S. Cl. ............... 156/273.3; 156/272.2; 156/275.1; 204/157.15; 204/157.6; 204/157.63; 428/411.1; 427/457

(58) Field of Classification Search ............... 156/273.3, 156/272.2, 275.1; 428/411.1; 204/157.15, 204/157.6, 157.63; 522/4; 427/457
See application file for complete search history.

(56) References Cited

OTHER PUBLICATIONS

Chen et al. Solventless Adhesive Bonding Using Reactive Polymer Coatings. Analytical Chemistry, vol. 80, No. 11 (Jun. 2008), pp. 4119-4124.*
Zhang et al. A low temperature ultrasonic bonding method for PMMA microfluidic chips. Microsystems Techonogy. (2010) 16:533-541.*
Berdichevsky et al. UV/ozone modification of poly(dimethylsiloxane) microfluidic channels. Sensors and Actuators B 97 (2004) 402-408.*
Tsai et al. Bonding of Themoplastic Polymer Microfluidics. Microfluid Nanofluid (2009) Chapter 6, pp. 1-16.*
Bhattacharyya et al. Mechanical and chemical analysis of plasma and ultraviolet-ozone surface treatments for thermal bonding of polymeric microfluidic devices. Lap Chip, 2007, 7, 876-882.*
Bhattacharyya, A., Kulinski, D., Klapperich, C., Fabrication of the Thermoplastic Microfluidic Channels. J Vis Exp. 12 (2008).*
Tennico et al. Surface modification-assisted bonding of polymer-based microfluidic devices. Sensors and Actuators B 143 (2010) 799-804.*
Truckenmuller et al. Bonding of polymer microstructures by UV irradition and subsequent welding at low temperatures. Microsystem Technollogies, 10 (2004), 372-374.*

* cited by examiner

*Primary Examiner* — Sanza McClendon
(74) *Attorney, Agent, or Firm* — William C. Schrot; Jeffrey I. Auerbach; The Auerbach Law Firm, LLC (57) ABSTRACT

The present invention relates to a method for bonding two surfaces to one another. The invention particularly pertains to the use of such method in which one of the surfaces is a polymeric plastic (and more preferably a polymeric thermoplastic (especially poly-(methyl methacrylate) ("PMMA") or cyclic olefin copolymer ("COC")). More particularly, the invention relates to treating at least one of the contacting surfaces with UV in the presence of oxygen to thereby generate ozone ($O_3$) and atomic oxygen under conditions of temperature below that of the glass transition temperature of the polymeric plastic. The UV/$O_3$-mediated bonding results in high bond strength and zero-deformation method. This bonding method can be applied to micro/nano-scale polymer devices, and particularly to microfluidic devices, for a low cost, high throughput, high yield advantage.

21 Claims, 4 Drawing Sheets

LOW TEMPERATURE POLYMER BONDING USING UV/OZONE SURFACE TREATMENT

CROSS-REFERENCE TO RELATED APPLICATIONS

This application claims priority to U.S. Patent Application Ser. No. 61/034,273 (filed Mar. 6, 2008), which application is herein incorporated by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of NSF CTS0304318 awarded by the National Foundation NIH R01GM072512 awarded by the National Institute of Health.

BACKGROUND OF THE INVENTION

1. Field of the Invention

The present invention relates to a method for bonding two surfaces to one another. The invention particularly pertains to the use of such method in which one of the surfaces is a polymeric plastic (and more preferably a polymeric thermoplastic (especially poly-(methyl methacrylate) ("PMMA") or cyclic olefin copolymer ("COC")). More particularly, the invention relates to treating at least one of the contacting surfaces with UV in the presence of oxygen to thereby generate ozone ($O_3$) and atomic oxygen under conditions of temperature below that of the glass transition temperature of the polymeric plastic. The UV/$O_3$-mediated bonding results in high bond strength and zero-deformation method. This bonding method can be applied to micro/nano-scale polymer devices, and particularly to microfluidic devices, for a low cost, high throughput, high yield advantage.

2. Description of Related Art

Rigid thermoplastic polymers have been extensively investigated over the past decade as substrates for the fabrication of microfluidic systems. Two particular polymeric thermoplastics: poly(methyl methacrylate) ("PMMA") and cyclic olefin copolymer ("COC"), have emerged as attractive materials for microfluidic applications, primarily due to their high transparency and low autofluorescence over a wide spectral range (Piruska, A. et al. (2005) "*The Autofluorescence Of Plastic Materials And Chips Measured Under Laser Irradiation,*" Lab on a Chip 5:1348-1354). In a typical process flow, open microchannels are formed in first a thermoplastic substrate using one of several techniques such as hot embossing (Martynova, L. et al. (1997) "*Fabrication of Plastic Microfluid Channels by Imprinting Methods,*" Anal. Chem. 69:4783-4789), cold embossing (Xu, J. et al. (2000) "*Room-Temperature Imprinting Method for Plastic Microchannel Fabrication,*" Anal. Chem. 72:1930-1933), micro-injection molding (McCormick, R. M. et al. (1997) "*Microchannel Electrophoretic Separations of DNA in Injection-Molded Plastic Substrates,*" Anal. Chem. 69:2626-2630), or laser ablation (Roberts, M. A. et al. (1997) "*UV Laser Machined Polymer Substrates for the Development of Microdiagnostic Systems,*" Anal. Chem. 69:2035-2042). A second plastic layer is then bonded to the first to enclose the microchannels.

A variety of bonding methods have been reported, including solvent bonding (Kricka, L. J. et al. (2002) "*Fabrication Of Plastic Microchips By Hot Embossing,*" Lab on a Chip 2:1-4; Klank, H. et al. (2002) "*$CO_2$-Laser Micromachining And Back-End Processing For Rapid Production Of PMMA-Based Microfluidic Systems,*" Lab on a Chip 2:242-246; Brown, L. et al. (2006) "*Fabrication And Characterization Of Poly(Methylmethacrylate) Microfluidic Devices Bonded Using Surface Modifications And Solvents,*" Lab on a Chip 6:66-73), thermal bonding (Sun, Y. et al. (2006) "*Low-Pressure, High-Temperature Thermal Bonding Of Polymeric Microfluidic Devices And Their Applications For Electrophoretic Separation,*" J. Micromech. Microeng. 16:1681-1688; Kelly, R. T. et al. (2003) "*Thermal Bonding of Polymeric Capillary Electrophoresis Microdevices in Water,*" Anal. Chem. 75:1941-1945), and thick film lamination employing either pressure or temperature sensitive adhesive layers (do Lago, C. L. et al. (2003) "*A Dry Process for Production of Microfluidic Devices Based on the Lamination of Laser-Printed Polyester Films,*" Anal. Chem. 75:3853-3858).

Of these techniques solvent and thermal bonding are of particular interest in the fabrication of microfluidic devices since they allow the same material to be used for both microfluidic substrate layers, and thereby ensure homogeneity in surface properties for all microchannel walls. In thermal bonding, interlayer adhesion is achieved by heating the substrates near their glass transition temperature while applying a normal pressure, allowing polymer chains to diffuse between the mating surfaces for high bond strength. However, thermal bonding suffers from several disadvantages. Because the substrates must be heated at or slightly above their glass transition temperature to achieve a strong interfacial bond, microscale channels can readily become deformed or collapsed, particularly for low aspect ratio channels and thin substrates. Furthermore, the resulting bond strength is often lower than desired, particularly for applications such as liquid chromatography where high internal fluid pressures are required. Solvent bonding can also suffer from problems with dimensional stability, since the absorbed solvent softens the plastic and can lead to polymer flow during bonding. While recipes have been developed to minimize this problem in PMMA microfluidic chips by using specific solvent conditions (see, Brown, L. et al. (2006) "*Fabrication And Characterization Of Poly(Methylmethacrylate) Microfluidic Devices Bonded Using Surface Modifications And Solvents,*" Lab on a Chip 6:66-73; Lin, C. H. et al. (2005) "*Low Azeotropic Solvent Sealing Of PMMA Microfluidic Devices,*" Proc. 13th Int. Conf. Solid-State Sensors, Actuators, and Microsystems (Transducers 05) 1:944-947), or sacrificial materials such as paraffin wax to prevent channel collapse (see, Kelly, R. T. et al. (2005) "*Phase-Changing Sacrificial Materials for Solvent Bonding of High-Performance Polymeric Capillary Electrophoresis Microchips,*" Anal. Chem. 77:3536-3541), the former recipes must be tuned for different polymer grades and types, and neither approach can entirely prevent deformation of channel geometries. Furthermore, solvents can embrittle thermoplastics and result in microcracking, particularly for microfluidic systems which require exposure to high or cyclical pressure loads.

Because of these challenges, there remains a need for effective methods for low temperature thermoplastic bonding, and which, in particular, are amenable to a wide range of microfluidic applications. The present invention is directed to this and other needs.

SUMMARY OF THE INVENTION

The present invention relates to a method for bonding two surfaces to one another. The invention particularly pertains to the use of such method in which one of the surfaces is a polymeric plastic (and more preferably a polymeric thermoplastic (especially poly-(methyl methacrylate) ("PMMA") or cyclic olefin copolymer ("COC")). More particularly, the invention relates to treating at least one of the contacting surfaces with UV in the presence of oxygen to thereby generate ozone ($O_3$) and atomic oxygen under conditions of temperature below that of the glass transition temperature of the polymeric plastic. The $UV/O_3$-mediated bonding results in high bond strength and zero-deformation method. This bonding method can be applied to micro/nano-scale polymer devices, and particularly to microfluidic devices, for a low cost, high throughput, high yield advantage.

As reported below, the use of $UV/O_3$ surface treatments for achieving low temperature bonds between PMMA and COC microfluidic substrates was evaluated. Low temperature bond strengths approaching those of native polymer substrates bonded above their glass transition temperatures were demonstrated for both thermoplastics. To evaluate the effects of the UV/ozone surface treatment on the operation of bonded microfluidic devices, the relationship between UV/ozone exposure and polymer hydrophilicity and surface chemistry were measured. Post-treatment surface chemistry was evaluated by XPS analysis, and the stability of the treated surfaces following solvent exposure was reported. Electroosmotic flow within fabricated microchannels with modified wall surfaces was also characterized. Overall, UV/ozone treatment is found to enable strong low temperature bonds between thermoplastic microfluidic substrates using a simple, low cost, and high throughput fabrication technology.

In detail, the invention provides a method for bonding a first surface of a polymeric plastic to a second surface, wherein the method comprises:
  (A) treating at least one of the surfaces with short wavelength UV light at a temperature below the deformation temperature of the plastic and in the presence of oxygen gas under conditions sufficient to generate atomic oxygen;
  (B) permitting the generated atomic oxygen to oxidize the bonding surface,
  (C) contacting the surfaces together to thereby bond them to one another.

The invention further pertains to the embodiment of such method wherein both the first and the second surfaces are treated with the UV light.

The invention further pertains to the embodiment of such method wherein the polymeric plastic is a polymeric thermoplastic and the deformation temperature is the glass transition temperature of the polymeric thermoplastic.

The invention further pertains to the embodiments of such methods wherein both the first and the second surfaces are surfaces of polymeric thermoplastic.

The invention further pertains to the embodiments of such methods wherein the polymeric plastic of both the first and the second surfaces is the same polymeric thermoplastic.

The invention further pertains to the embodiments of such methods wherein the polymeric thermoplastic is poly-(methyl methacrylate) and wherein the temperature is from about 25° C. to about 95° C.

The invention further pertains to the embodiments of such methods wherein the polymeric thermoplastic is cyclic olefin copolymer and wherein the temperature is from about 25° C. to about 100° C.

The invention also provides a composition comprising a thermoplastic polymer having a first surface bonded to a contacting second surface, wherein the bonding was accomplished through a method which comprises:
  (A) treating the first or second surface with short wavelength UV light at a temperature below the glass transition temperature of the thermoplastic and in the presence of oxygen gas under conditions sufficient to generate atomic oxygen;
  (B) permitting the generated atomic oxygen to oxidize the bonding surface, and thereby facilitate the bonding of the thermoplastic polymer to the surface;
wherein the bond between the polymer and the surface is at least 10 fold greater than the maximal bond strength exhibited between the thermoplastic polymer and the surface in the absence of the UV treatment.

The invention further pertains to the embodiment of such composition wherein the bond between the polymer and the surface is at least 100 fold greater than the maximal bond strength exhibited between the thermoplastic polymer and the surface in the absence of the UV treatment.

The invention further pertains to the embodiments of such compositions wherein both the first and second surfaces are treated with the UV light.

The invention further pertains to the embodiments of such compositions wherein both the first and the second surfaces are surfaces of polymeric thermoplastic.

The invention further pertains to the embodiments of such compositions wherein the polymeric thermoplastic of both the first and the second surfaces is the same polymeric thermoplastic.

The invention further pertains to the embodiments of such compositions wherein the polymeric thermoplastic is poly-(methyl methacrylate) and particularly, wherein the bond strength is greater than 300 mJ/cm².

The invention further pertains to the embodiments of such compositions wherein the polymeric thermoplastic is cyclic olefin copolymer and particularly, wherein the bond strength is greater than 50 mJ/cm².

The invention further pertains to the embodiments of such compositions wherein the the composition is a microfluidic system comprising an interconnected reservoir and microchannel and particularly wherein the microfluidic system conducts a preparative or analytical chemical reaction.

BRIEF DESCRIPTION OF THE DRAWINGS

FIGS. 3A-3B show SEM images of 500 μm wide, 180 μm deep PMMA microchannels following thermal bonding of 24 min. $UV/O_3$ treated PMMA substrate at 60° C. (FIG. 3A) and thermal bonding of virgin PMMA substrates at 100° C. (FIG. 3B). While substantial collapse of the channel is evident for the virgin PMMA chip, the $UV/O_3$ treated channel exhibits no measurable deformation while offering higher bond strength compared to the untreated chip.

Error bars indicate standard deviations among 3 replicate EOF measurements for each case.

DETAILED DESCRIPTION OF THE INVENTION

The present invention relates to a method for bonding two surfaces to one another. The invention particularly pertains to the use of such method in which one of the surfaces is a polymeric plastic (and more preferably a polymeric thermoplastic (especially poly-(methyl methacrylate) ("PMMA") or cyclic olefin copolymer ("COC")). More particularly, the invention relates to treating at least one of the contacting surfaces with UV in the presence of oxygen to thereby generate ozone ($O_3$) and atomic oxygen under conditions of temperature below that of the glass transition temperature of the polymeric plastic. The UV/$O_3$-mediated bonding results in high bond strength and zero-deformation method. This bonding method can be applied to micro/nano-scale polymer devices, and particularly to microfluidic devices, for a low cost, high throughput, high yield advantage.

A. Thermoplastic Polymers

As used herein, the term "polymeric thermoplastic" denotes a solid polymeric plastic that liquefies when heated and re-solidifies to a glassy state when cooled sufficiently, and which can be repeatedly liquefied and solidified. Examples of such polymeric thermoplastics include: acrylic polymers (e.g., Polyacrylates, PMMA), Acrylonitrile butadiene styrene (ABS), celluloid, cellulose acetate, cyclic olefin copolymer (COC), ethylene vinyl alcohol (EVOH), ethylene-vinyl acetate (EVA), fluoroplastics (PTFE, alongside with FEP, PFA, CTFE, ECTFE, ETFE), ionomers, Polyacetal (POM or Acetal), (Acrylic), polyacrylonitrile (PAN or Acrylonitrile), polyamide (PA), polyamide-imide (PAI), polyaryletherketone (PAEK), polybutadiene (PBD), polybutylene (PB), polybutylene terephthalate (PBT), polycaprolactone (PCL), polycarbonate (PC), polychlorotrifluoroethylene (PCTFE), polycyclohexylene dimethylene terephthalate (PCT), polyester, Polyetheretherketone (PEEK), polyetherimide (PEI), polyetherketoneketone (PEKK), polyethersulfone (PES), polyethylene (PE), polyethylene terephthalate (PET), polyethylenechlorinates (PEC), polyhydroxyalkanoates (PHAs), polyimide (PI), polyketone (PK), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), and styrene-acrylonitrile (SAN).

The invention is illustrated with respect to the preferred polymeric thermoplastics of the present invention: poly-(methyl methacrylate) ("PMMA") and cyclic olefin copolymer ("COC"). The structures of these compounds are produced below:

Poly-(Methyl Methacrylate)

Cyclic Olefin Copolymer

Although the invention is illustrated with respect to COC (i.e., compositions in which x>0 and y>0 (i.e., a cyclic olefin copolymer), the invention is equally applicable to the use of cyclic olefin polymer ("COP") (i.e., compositions in which x=0 and y>0). It should also be noted that different grades of these various polymers and copolymers can be formed, and the proportion of their substituents (i.e., the ratio x:y may be varied, in order to produce compositions having a desired glass transition temperature. By varying the ratio x:y compositions having a wide range of glass transition temperatures may be produced. PMMA is described in U.S. Pat. Nos. 7,173,093; 6,906,142; 6,890,993; 5,258,423 and 5,084,495. COC is described in U.S. Pat. Nos. 6,844,059; 6,590,033; 6,255,396; 5,087,677; 4,918,133 and 4,614,778, and in United States Patent Publication No. 2008/0033112 and in Shin, J. Y. et al. (2005) "*Chemical Structure And Physical Properties Of Cyclic Olefin Copolymers*," Pure Appl. Chem. 77(5):801-814.

The invention is particularly directed to embodiments in which the contacting surfaces are composed of hydrophobic, or weakly hydrophilic, compositions, and encompasses embodiments in which the two contacting surfaces are composed of the same polymeric plastic (or thermoplastic) (for example, to achieve the bonding of a first PMMA surface to a second PMMA surface or the bonding of a first COC surface to a second COC surface), as well as embodiments in which only one of the two contacting surfaces is a polymeric plastic or thermoplastic (for example, to achieve the bonding of a first PMMA or COC surface to a second surface composed of a different thermoplastic (e.g., COC or PMMA, respectively) or a different plastic, or a ceramic, metal, glass, elastomer, or other support.

B. Microfluidic Systems

As used herein, the term "microfluidic system" denotes a device which comprises a system of one or more microchannels, microreservoirs, microvalves and/or microports organized to permit the performance or detection of a chemical reaction, analysis or synthesis. Such microfluidic systems may be employed for either preparative or analytical applications. Such devices may optionally be adapted for use with automated systems, thereby providing the additional benefits of further cost reductions and decreased operator errors because of the reduction in human involvement. Microfluidic devices have been proposed for use in a variety of applications, including, for example in capillary electrophoresis, gas chromatography, cell separations, etc. Microfluidic devices are disclosed in: WO2007082737, WO2053290, WO2008110975, WO2008110993, WO2007021809, WO05088710, WO03044221; WO2007113181, WO2007060636, WO06111628 and in U.S. Pat. Nos. 6,767, 194; 6,843,263; 6,929,730; 6,974,526; 7,041,257; 7,069,943; 7,070,682; 7,094,345; 7,129,091; 7,179,423; 7,243,670; 7,375,404; 7,455,770; and in Yang, S. et al. (Epub 2008 Nov. 19) "*Microfluidic 2-D PAGE Using Multifunctional In Situ Polyacrylamide Gels And Discontinuous Buffers*," Lab Chip. 9(4):592-599; Yang, S. et al. (Epub 2008 May 9) "*Optimization Of Sample Transfer In Two-Dimensional Microfluidic Separation Systems*," Lab Chip. 8(7):1145-1152; Hromada, L. P. et al. (Epub 2008 Feb. 29) "*Single Molecule Measurements Within Individual Membrane-Bound Ion Channels Using A Polymer-Based Bilayer Lipid Membrane Chip*," Lab Chip. 8(4):602-608; Tsao, C. W. et al. (Epub 2007 Mar. 7) "*Low Temperature Bonding Of PMMA And COC Microfluidic Substrates Using UV/$O_3$ Surface Treatment*," Lab Chip. 7(4):499-505; DeVoe, D. L. et al. (2006) "*Microfluidic Technologies For MALDI-MS In Proteomics*," Electrophoresis 27(18):3559-3568; Zhu, L. et al. (2006) "*Integrated Microfluidic UV Absorbance Detector With Attomol-Level Sensitivity For BSA*," Lab Chip. 6(1):115-120; Sivanesan, P. et al. (2005) "*Polymer Nanochannels Fabricated By Thermome-* chanical Deformation For Single-Molecule Analysis," Anal Chem. 77(7):2252-2258; and Buch, J. S. et al. (2001) "Field-effect flow control in a polydimethylsiloxane-based microfluidic system," Electrophoresis 22(18):3902-3907.

The prior difficulty in realizing high bond strengths for polymer microfluidic chips is in large part due to the low surface energies of polymeric thermoplastics. Polymeric thermoplastics, including PMMA and COC, are formed from hydrocarbons with additional atomic components such as oxygen and nitrogen. These surfaces possess low specific energy and thus tend to be hydrophobic or weakly hydrophilic, limiting the strength of bonds which may be formed between mating substrates. Increased surface energy serves to improve the wettability between the mating surfaces through enhanced mechanical interlocking and interdiffusion of chains. Bonding can also be enhanced through the generation of electrostatic interactions, and surfaces possessing high specific energy in the form of polar functional groups which can produce hydrogen or covalent bonds across the interface are capable of providing bond strengths exceeding that of the bulk polymer (Truckenmuller, R. et al. (2004) "*Bonding Of Polymer Microstructures By UV Irradiation And Subsequent Welding At Low Temperatures*," Microsystem Technologies 10:372-374).

A variety of approaches for increasing the surface energy of polymeric plastics have been demonstrated and are routinely used in macroscale polymer engineering, including solvent or acid treatments (Wu, S. (1982) POLYMER INTERFACE AND ADHESION, Marcel Dekker, New York), surface grafting plasmas (Uyama, Y. et al. (1998) "*Surface Modification of Polymers by Grafting*," Advances in Polymer Science 137:1-39; Hu, S. et al. (2005) "*Surface Grafting on Polymer Surface Using Physisorbed Free Radical Initiators*," Macromolecules 38:6592-6597), and vacuum (Kruse, A. et al. (1995) "*Surface Pretreatment Of Plastics For Adhesive Bonding*," J. Adhes. Sci. Technol. 9:1611-1621; Collaud, M. et al. (1994) "*A Surface Acoustic Wave Sensor Study Of Polyimide Thin Film Surface Treatments-Effect On Water Uptake*," J. Adhes. Sci. Technol. 8:1143-1156) and atmospheric (Shenton, M. J. et al. (2001) "*Adhesion Enhancement Of Polymer Surfaces By Atmospheric Plasma Treatment*," J. Phys. D: Apply. Phys. 34:2754-2760). It is well known that energetic ions, electrons, and UV photons in plasmas can possess sufficient energy to break chemical bonds on the target surface, producing highly reactive free radicals that can help to form the desired charged surface groups and increase the overall surface energy. Plasma activation has been widely used to prepare hydrophilic polymer microfluidic substrates based on elastomeric materials such as PDMS (Shenton, M. J. et al. (2001) "*Adhesion Enhancement Of Polymer Surfaces By Atmospheric Plasma Treatment*," J. Phys. D: Apply. Phys. 34:2754-2760), and rigid thermoplastics including both PMMA (Lee, G. B. et al. (2005) "*On The Surface Modification Of Microchannels For Microcapillary Electrophoresis Chips*," Electrophoresis 26:4616-4624; Johansson, B. L. et al. (2002) "*Characterization Of Air Plasma-Treated Polymer Surfaces By ESCA And Contact Angle Measurements For Optimization Of Surface Stability And Cell Growth*," J. Appl. Polymer Sci. 86:2618-2625) and COC (Johansson, B. L. et al. (2002) "*Characterization Of Air Plasma-Treated Polymer Surfaces By ESCA And Contact Angle Measurements For Optimization Of Surface Stability And Cell Growth*," J. Appl. Polymer Sci. 86:2618-2625; Puntambekar, A. et al. (2002) "*Fixed-Volume Metering Microdispenser Module*," Proc. Micro Total Analysis Systems (microTAS), Nara, Japan; Nikolova, D. et al. (2004) "*Surface Modification Of Cycloolefinic Copolymers For Optimization Of The Adhesion To Metals*," Surf. Interface Anal. 36:689-693). Direct exposure of PMMA to UV without ozone generation has also been explored for photochemically patterning energetic surface groups (Wei, S. et al. (2005) "*Photochemically Patterned Poly(methyl methacrylate) Surfaces Used in the Fabrication of Microanalytical Devices*," J. Phys. Chem. B 109:16988-16996).

Low temperature bonding of microstructured PMMA and COC surfaces was recently reported using $O_2$ plasma activation (Kettner, P. et al. (2006) "*New Results on Plasma Activated Bonding of Imprinted Polymer Features for Bio MEMS Applications*," J. Phys.:Conf. Series 34:65-71).

B. $UV/O_3$ Treatment

The present invention derives, in part, from the recognition that $UV/O_3$ surface treatment provides an alternative approach to achieving high bond strengths between two surfaces at low process temperatures. As used herein, the term "$UV/O_3$" treatment relates to a treatment that employs UV-C light (e.g., UV light having a wavelength in the range of 100-280 nm to both generate ozone from molecular oxygen and to destroy the generated ozone (thus leading to a steady state concentration of atomic oxygen).

$UV/O_3$ treatment is a technique initially developed for the removal of organic contaminants from semiconductor substrates which was explored for depolymerization of photoresists in 1972 (Bolon, D. A. et al. (1972) "*Ultraviolet Depolymerization Of Photoresist Polymers*," Polymer Eng. Sci. 12:109-111) and further developed over the following decade as an alternative to oxygen plasma ashing (Sowell, R. R. et al. (1974) "*Surface Cleaning By UV Radiation*," J. Vac. Sci. Technol. 11:474-475; Vig, J. R. et al. (1976) "*$UV/O_3$ Cleaning of Surfaces*," IEEE Trans. Parts, Hybrid and Packaging 12:365-370; Vig, J. R. (1985) "*$UV/O_3$ Cleaning of Surfaces*," J. Vac. Sci. Technol. A 3:1027-1034).

A preferred means for mediating the $UV/O_3$ treatment of the present invention is to expose at least one of the contacting surfaces (and more preferably both such surfaces to illumination from a low-pressure mercury lamp in an air-filled chamber at atmospheric pressure. Such a lamp is a highly efficient UV light source of short wavelength. Classified as in the same group as fluorescent lamps or germicidal lamps, the main light emission is a 253.7 nm line comprising a 184.9 nm line of far shorter wavelength. Light output at a wavelength of 184.9 nm is absorbed by oxygen in the air, resulting in the generation of ozone. At the same time, the mercury tube's output at 253.7 nm is absorbed by the ozone, leading to breakup of the ozone molecules. As ozone is being continually generated and destroyed, a steady-state concentration of atomic oxygen develops within the chamber, where it acts as a strong oxidizing agent. Hydrocarbons on the substrate surface are rapidly oxidized by this agent, and the reactivity is enhanced by the fact that most hydrocarbons also absorb the 253.7 nm radiation from the UV source. This approach has previously been shown to be effective in removing organic contaminants from a number of substrate materials including silicon, silicon nitride, glass, quartz, metals, and various polymers (Vig, J. R. (1985) "*$UV/O_3$ Cleaning of Surfaces*," J. Vac. Sci. Technol. A 3:1027-1034).

At sufficiently high energy levels, $UV/O_3$ exposure can break polymer chains and insert oxygen-containing functional groups into the surface (Peeling, J. et al. (1983) "*Surface Ozonation And Photooxidation Of Polyethylene Film*," J. Polym. Sci.:Polym. Chem. 21:2047-2055). The oxidation results a more energetic surface, thereby increasing hydrophilicity and enhancing wettability. For application to polymer microfluidics, the higher wettability can lead to improved low temperature bond strength between mating polymer surfaces. Unlike vacuum plasma treatment, UV/$O_3$ treatment is a high-throughput and low-cost process which can be performed using commercially-available systems originally designed for semiconductor substrate cleaning. UV/$O_3$ treatment provides the further benefit of removing unwanted organic contaminants from the polymer surface, thereby simplifying substrate handling requirements prior to exposure.

The oxidation of PMMA and COC surfaces by UV/$O_3$ is a simple and effective method for low temperature bonding of thermoplastic microfluidic substrates. As used herein, the term "low temperature" is intended to refer preferably to a temperature of from about room temperature (25° C.) to just below the deformation temperature of the employed polymer. For example, where one of the surfaces being bonded is a polymeric thermoplastic, the employed "low temperature" will be a temperature of from about room temperature (25° C.) to just below the glass transition temperature of the thermoplastic (e.g., just below 98° C. for PMMA, just below 105° C. for COC, etc.). Temperatures above the glass transition temperature may be employed to achieve bonding, however, they result in deformation of the thermoplastic and are not suitable in applications in which the retention of structure of the thermoplastic is desired (e.g., for microfluidic devices). In other embodiments, in which retention of structure is not relevant or required (for example, sealing, to air or water, etc., or coating a surface with a liquid or atomized solid spray plastic or thermoplastic), temperatures above the deformation (or glass transition) temperature of such plastic (or thermoplastic) may be employed.

Thus, for bonding to PMMA, the employed low temperature will preferably be from about 25° C. to about 95° C., still more preferably from about 40° C. to about 90° C., and still more preferably, from about 50° C. to about 90° C., and still more preferably, from about 60° C. to about 90° C., and still more preferably, from about 70° C. to about 90° C., and still more preferably, from about 80° C. to about 90° C., and still more preferably about 90° C. For bonding to COC, the employed low temperature will be from about 25° C. to about 100° C., still more preferably from about 40° C. to about 100° C., and still more preferably, from about 50° C. to about 100° C., and still more preferably, from about 60° C. to about 100° C., and still more preferably, from about 70° C. to about 100° C., and still more preferably, from about 80° C. to about 100° C., and still more preferably, from about 90° C. to about 100° C., and still more preferably about 100° C.

While surface oxidation based on $O_2$ plasma treatments has been previously described for enhanced low temperature bonding of microfluidic thermoplastic substrates, the UV/$O_3$ method reported here offers advantages including low equipment cost, low fabrication cost, and high throughput. In general, the energetic surfaces produced by UV/$O_3$ treatment resulted in at least 1-2 orders of magnitude improvement in bond strength for both PMMA and COC. High bond strengths were realized when sealing channels well below the materials' glass transition temperatures, while even room temperature bonding of UV/$O_3$ treated substrates resulted in bond strengths sufficient for typical sealing requirements in most microfluidic applications.

A high level of control over hydrophilicity was observed using UV/$O_3$ treatments, with resulting sessile water contact angles as low as 25° for PMMA surfaces. While the lowest contact angle observed with COC was only 49°, the resulting COC surfaces remained relatively stable compared to PMMA when exposed to solvents, with both materials exhibiting a similar range of final contact angle values on the order of 55°. Since practical microfluidic systems generally require exposure to aqueous or organic solutions, this value is of practical interest for applications in which UV/$O_3$ has been used for low temperature bonding during device fabrication. In addition to control of surface hydrophilicity for enhanced low-temperature substrate bonding, the generation of charged species by UV/$O_3$ treatment can also be used to enable the formation of stable secondary surface modifications in polymer microchannels.

Most preferably, the methods used to mediate UV/$O_3$ treatment will be those described by Tsao, C. W. et al. (Epub 2007 Mar. 7) "*Low Temperature Bonding Of PMMA And COC Microfluidic Substrates Using UV/$O_3$ Surface Treatment*," Lab Chip. 7(4):499-505, herein incorporated by reference in its entirety.

Having now generally described the invention, the same will be more readily understood through reference to the following examples, which are provided by way of illustration and are not intended to be limiting of the present invention unless specified.

EXAMPLES

Example 1

Chip Preparation and bonding. Microfluidic substrates were prepared from 2.0 mm thick COC (Zeonor 1020 R®, Zeon Chemicals L. P., Louisville, Ky. was employed in this and the following examples to exemplify the use of cyclic olefin copolymer in accordance with the present invention) and 1.6 mm thick PMMA (Optix® Acrylic Sheet, Plaskolite Inc., Columbus, Ohio was employed in this and the following examples to exemplify the use of poly-(methyl methacrylate) compositions in accordance with the present invention). The thickness of the COC plates was reduced from 2 mm to 1.6 mm by placing a 1.6 mm gauge block between two optically smooth glass plates in a commercial hot press (AutoFour/15, Carver, Wabash, Ind.), with the platen heated to 120° C. at a pressure of 6.9 MPa for 1 hour. Goniometer measurements performed on COC substrates before and after thickness reduction revealed no statistically meaningful change in contact angle resulting from this process.

UV/$O_3$ exposure was performed using a commercial ozone cleaning system (PSD-UV, Novascan Technologies, Ames, Iowa). Manufacturer specifications for the 50 W system state that approximately 50% of the total lamp output power is delivered around the 254 nm peak, and 5% around the 185 nm peak. Assuming the total 50 W power is evenly distributed over a 15 cm diameter circle corresponding to the maximum substrate size supported by the tool, a rough estimate of output powers used in this study are 14 mW/$cm^2$ at 254 nm, and 1.4 mW/$cm^2$ at 185 nm.

Polymer test samples were cut into 2.5 cm square pieces by CNC milling. Contact angles before and after treatments were measured using an optical goniometer (Cam Plus Micro, Tantec Inc., Schaumburg, Ill.). Surface elemental analysis employed an x-ray photoelectron spectrometer (Axis 165, Kratos Analytical Inc, Chestnut Ridge, N.Y.).

Bonding of the polymer chips was performed using a hot press with a 150 kN load capacity (AutoFour/15, Carver, Wabash, Ind.). Platen parallelity was checked prior to bonding to ensure uniform force distribution. The COC and PMMA samples were rinsed with 2-propanol (IPA) and DI water, dried with $N_2$, and dehydrated in a vacuum oven at 85° C. for 2 hr. The platen were preheated to the desired bonding temperature, followed by application of a fixed pressure of 4.8 MPa for 10 min. Bonding temperatures were monitored using a thermocouple inserted into a custom aluminum chip holder.

PVA Preparation and coating. Polyvinyl alcohol (PVA) solution was prepared by mixing 2 g of 99+% hydrolyzed PVA powder (Sigma-Aldrich, St. Louis, Mo.) into 100 mL of >18MΩ DI water. For contact angle measurements, substrates were dipped into the PVA solution for 10 min at room temperature, then removed from the solution and incubated for 10 min at 95° C. The dip/incubation cycle was repeated 3 times. After final incubation, the substrates were rinsed with DI water and gently dried using an $N_2$ gun. For measurements of electroosmotic flow (EOF), PVA solution was introduced into the microchannels using a syringe pump, flushed with N2 after 10 min, and incubated at 95° C. for 20 min. The fill/flush/incubate process was repeated twice. Control experiments were performed using an identical process but without $UV/O_3$ treatment.

EOF Measurements. A solution of tris-borate (TB) Buffer (100 mM Tris, 20 mM boric acid, pH 9.1) was prepared and introduced into microchannels fabricated by hot embossing from a silicon template fabricated by deep reactive-ion etching (DRIE). All channels used for EOF measurements were 100 μm wide, 69 μm high, and 4 cm long. Measurements of electroosmotic mobility were performed using a current monitoring method (Huang, X. H. et al. (1988) "*Current-Monitoring Method For Measuring The Electroosmotic Flow Rate In Capillary Zone Electrophoresis*," Anal. Chem. 60:1837-1838; Gaudioso, J. et al. (2002) "*Characterizing Electroosmotic Flow In Microfluidic Devices*," Journal of Chromatography A 971:249-253). After flushing a microchannel with DI water and filling with the initial TB buffer, a voltage of 550 V was applied to one reservoir, with the second reservoir grounded. Voltages were applied using platinum wires placed within the open on-chip reservoirs, and current was directly monitored using a current meter at the grounded reservoir. After an initial current stabilization period of 1-2 min, the voltage was turned off and buffer solution was removed from the high voltage reservoir using a pipette and replaced with a new solution of TB buffer containing 10 mM boric acid. The voltage was then re-applied, and current through the microchannel was monitored as EOF displaced initial buffer with the lower conductivity solution.

Example 2

The application of $UV/O_3$ surface treatments for low temperature bonding of PMMA and COC substrates was evaluated. In general, it is observed that $UV/O_3$ treated surfaces enable moderate bond strengths even at room temperature, and at higher temperatures produce bond strengths which rival native polymers bonded above their respective glass transition temperatures. Despite the potential benefits of $UV/O_3$ treatment for low temperature microfluidic substrate bonding, $UV/O_3$ exposure affects surface chemistry and can potentially alter the performance of microfluidic systems. To address this issue, surface stability and electroosmotic flow performance were also considered.

Contact Angle. The maximum bond strength which may be realized between two mating surfaces is a function of surface wettability. Surface contact angles were evaluated as a function of $UV/O_3$ exposure prior to performing direct bond strength measurements. Average goniometer measurements reported here were performed from a minimum of 3 locations on each tested substrate. Contact angle measurements were highly reproducible, with an average relative standard deviation of less than 2.5% across all reported measurements. Due to this low variation, error bars are not shown in the contact angle plots.

The native PMMA substrates used in this study exhibited an average contact angle of 80.3±1.0°. This value is slightly higher than previously reported values of 75±2° (Raghavan, D. et al. (2000) "*Characterization of Heterogeneous Regions in Polymer Systems Using Tapping Mode and Force Mode Atomic Force Microscopy*," Langmuir 16:9448-9459) and 76±4° (Brown, L. et al. (2006) "*Fabrication And Characterization Of Poly(Methylmethacrylate) Microfluidic Devices Bonded Using Surface Modifications And Solvents*," Lab on a Chip 6:66-73). The native COC substrates were also weakly hydrophobic with an average contact angle of 94.7±1.0°, comparable to values measured over a range of COC materials from different vendors (Nikolova, D. et al. (2004) "*Surface Modification Of Cycloolefinic Copolymers For Optimization Of The Adhesion To Metals*," Surf. Interface Anal. 36:689-693; Shin, J. Y. et al. (2005) "*Chemical Structure And Physical Properties Of Cyclic Olefin Copolymers*," Pure Appl. Chem. 77:801-814). A series of PMMA and COC chips were treated by $UV/O_3$ in 4 minute increments. Following treatment of all samples, the sessile water contact angle for each sample was measured, with the results provided in FIG. 1 (solid lines). The contact angle for PMMA dropped gradually for the first 20 minutes of $UV/O_3$ exposure. In contrast, the contact angle for the COC substrates dropped rapidly during the first 4 minutes of treatment, but showed little change during the following 20 minutes of treatment time. Minimum contact angles of 25.3° and 49.3° were achieved following 24 minutes exposure for PMMA and COC, respectively. These values compare favorably with contact angles reported for vacuum plasma treated PMMA (35°) (Brown, L. et al. (2006) "*Fabrication And Characterization Of Poly(Methylmethacrylate) Microfluidic Devices Bonded Using Surface Modifications And Solvents*," Lab on a Chip 6:66-73) and COC (40°) (Nikolova, D. et al. (2004) "*Surface Modification Of Cycloolefinic Copolymers For Optimization Of The Adhesion To Metals*," Surf. Interface Anal. 36:689-693).

Two samples of treated PMMA and COC exposed for 4 minutes and 24 minutes were stored in ambient atmosphere for 15 days, after which contact angles were measured again. No measurable change in contact angle was observed for any of the samples. Similar aging experiments performed in air for PDMS treated by atmospheric plasma showed rapid degradation of the surface zeta potential (ζ), with greater than 50% reduction in ζ observed after 10 hours (Shenton, M. J. et al. (2001) "*Adhesion Enhancement Of Polymer Surfaces By Atmospheric Plasma Treatment*," J. Phys. D: Apply. Phys. 34:2754-276). Furthermore, treated PMMA and COC chips heated to 90° C. for 1 hour exhibited no measurable change in average contact angle. This result provides confidence that treated chips bonded at elevated temperatures, but remaining below glass transition, can retain their hydrophilicity during the bonding process.

Figure 1:
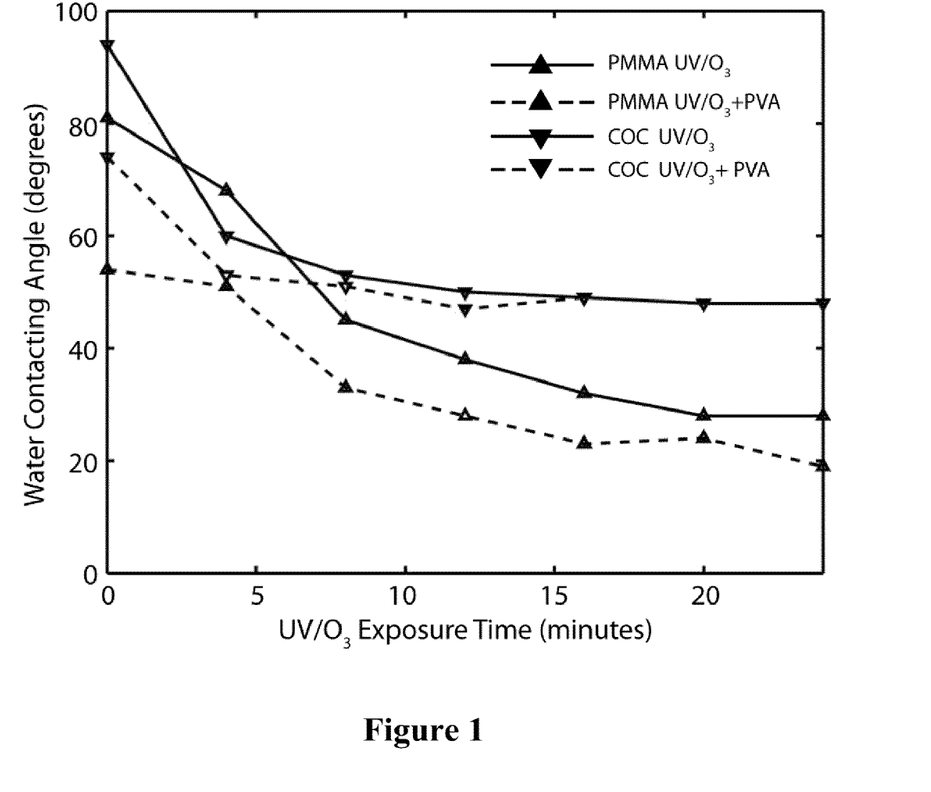
FIG. 1 shows the water contact angle for PMMA and COC substrates after $UV/O_3$ treatment and $UV/O_3$ treatment followed by PVA coating.

Contact angles were also evaluated with the addition of a polyvinyl alcohol (PVA) coating step following $UV/O_3$ treatment. PVA is a hydrophilic charge-neutral polymer often used for reducing protein adsorption in silica capillaries (Doherty, E. A. S. et al. (2003) "*Microchannel Wall Coatings For Protein Separations By Capillary And Chip Electrophoresis*," Electrophoresis 24:34-54) by either dynamic or a static coating (Gilges, M. et al. (1994) "*Capillary Zone Electrophoresis Separations of Basic and Acidic Proteins Using Poly(vinyl alcohol) Coatings in Fused Silica Capillaries*," Anal. Chem. 66:2038-2046). The motivation for considering PVA is discussed in more detail in the following section on electroosmotic flow characterization. To determine whether PVA coating could further increase the hydrophilicity of the $UV/O_3$ treated PMMA and COC substrates, a series of samples were treated for varying times and coated with PVA. The resulting contact angles are shown in FIG. 1 (dashed lines). The use of PVA coating on the PMMA surfaces was found to provide a consistent improvement in hydrophilicity, with an average decrease in contact angle of 27% over all exposure times. For the COC substrates, PVA coating reduced the contact angle by 21% for the 4 min treated sample, but no improvement was observed for exposure times beyond 12 min.

Bond Strength. To evaluate the improvement in bond strength for the treated substrates, a set of PMMA and COC chips were exposed in the UV/O$_3$ system for 24 min. Bonding was performed at temperatures between 25° C. and 110° C. for both UV/O$_3$ treated and untreated chips. Bond strength for the bonded chips was determined using a crack-opening method (Maszara, W. P. et al. (1988) "*Bonding Of Silicon Wafers For Silicon-On-Insulator*," J. Appl. Phys. 64:4943-4950), in which a blade of known thickness is inserted between the bonded substrates, and the length of the interfacial fracture crack measured to evaluate the bond strength. The relationship between crack opening length, L, and interfacial surface energy (bond strength), γ, is given by:

$$\gamma = \frac{3Et_s^3 t_b^2}{32L^4}$$

(see, Maszara, W. P. et aL (1988) "*Bonding Of Silicon Wafers For Silicon-On-Insulator*," J. Appl. Phys. 64:4943-4950), where E is the elastic modulus of the substrate, $t_s$ and $t_b$ are the thickness of substrate and inserted blade, respectively, and L is the measured crack length generated by the inserted blade. Using elastic moduli for PMMA and COC of 3.3 GPa (Optix Acrylic Sheet Properties, Plaskolite Inc., 2005) and 2.1 Gpa (Zeon Chemicals, Editon edn., 2004, vol. publication no. 601ZR10080BP), respectively, the resulting bond strengths calculated from the equation are plotted against bond temperature in FIG. 2. All tests were performed using a stainless steel razor blade with a thickness of 100 µm, with crack lengths measured under a microscope using a calibrated reticle. Uncertainty in crack length measurements, estimated at 200 µm, was found to dominate the measurement variance, resulting in bond strength uncertainties of 14% for PMMA and 10% for COC.

For native untreated chips, the relationship between bond temperature and bond strength follows a similar trend for both PMMA and COC. Below 90° C., no bonding was observed for untreated chips. At 90° C., interfacial cracks propagated across the entire length of the 2.5 cm chips upon insertion of the blade, fully debonding the substrates during measurements. Note that the trend lines for native PMMA and COC in FIG. 2 assume a bond strength value corresponding to the 2.5 cm crack length at 90° C., which is off the plot; the true bond strengths are likely below this value. Maximum bond strengths of 2.10 mJ/cm² for PMMA and 1.13 mJ/cm² for COC were achieved for the untreated chips at the highest tested bonding temperature of 110° C. Because this bond temperature is substantially above the glass transition temperature of both PMMA (98° C.) and COC (105° C.), these maximum values could not be achieved in real-world devices without substantially deforming or collapsing microchannels within the substrates, and are provided only for comparison to the bond strengths achieved at lower temperatures when using UV/O$_3$ treatment.

Figure 2:
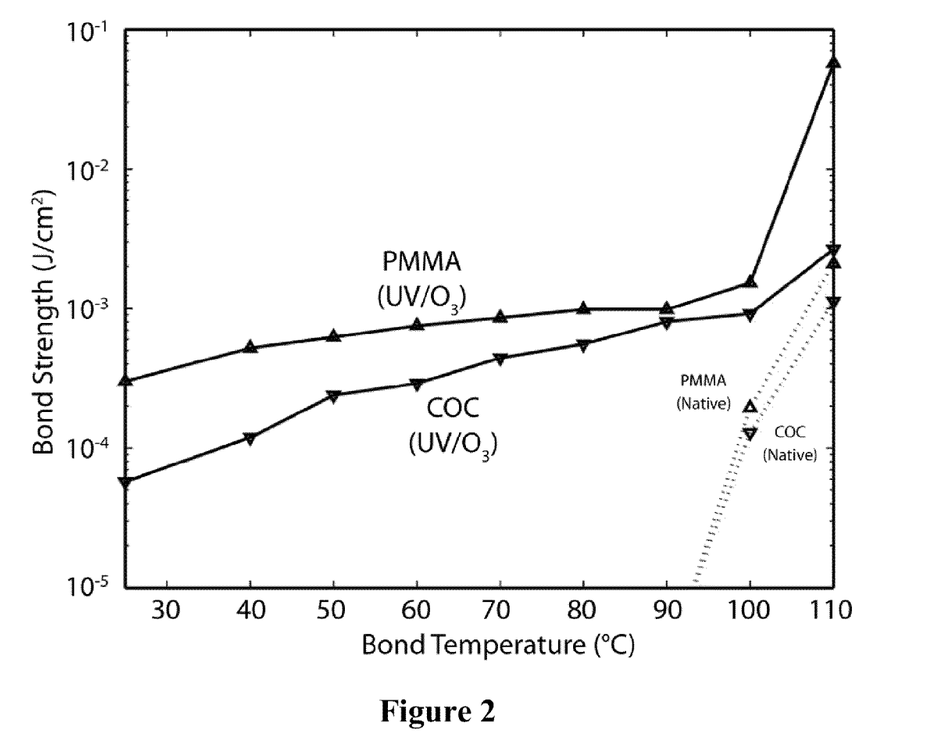
FIG. 2 shows the bond strength of PMMA and COC substrates following 24 minutes of UV treatment, compared with native polymer surfaces.

Measurements performed on a set of UV/O$_3$ treated chips reveal substantial improvements in bond strength compared to the corresponding untreated cases. As shown in FIG. 2, both polymers exhibit a logarithmic relationship between bond temperature and bond strength over a wide temperature range from 25-90° C. Large jumps in bond strength are observed as the bond temperature is elevated above the glass transition temperatures of the two materials. At 110° C., the bond strengths of the UV/O$_3$ treated chips are significantly higher than that of the untreated chips bonded at the same temperature. A likely reason for this observation is that the higher wettability of the treated chips enables more intimate contact between the surfaces during thermal bonding, allowing improved interdiffusion of polymer chains and an attendant increase in bond strength.

A summary of selected bond strength values is provided in Table 1. Even at room temperature, UV/O$_3$ surface activation provides sufficient bond strength for low pressure applications. At 90° C., the UV/O$_3$ treated chips exhibit bond strengths at least 2 orders of magnitude higher than their untreated counterparts, and nearly as high as the maximum bond strengths achieved for substrates bonded above their glass transition temperatures.

TABLE 1

Summary Of Average Bond Strengths At Selected Bond Temperatures
Bond Strength/mJ cm$^{-2}$

| Material | Surface | 25° C. | 50° C. | 90° C. | 110° C. |
|---|---|---|---|---|---|
| PMMA | UV/O$_3$ | 0.301 | 0.624 | 0.984 | 57.26 |
|  | Native | — | — | <0.003 | 2.098 |
| COC | UV/O$_3$ | 0.57 | 0.239 | 0.806 | 2.659 |
|  | Native | — | — | <0.003 | 1.128 |

Figure 3A:
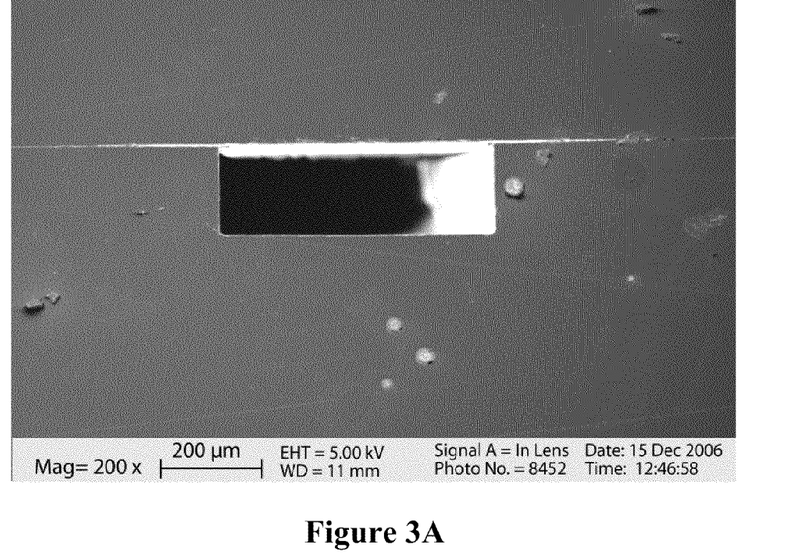
Figure 3B:
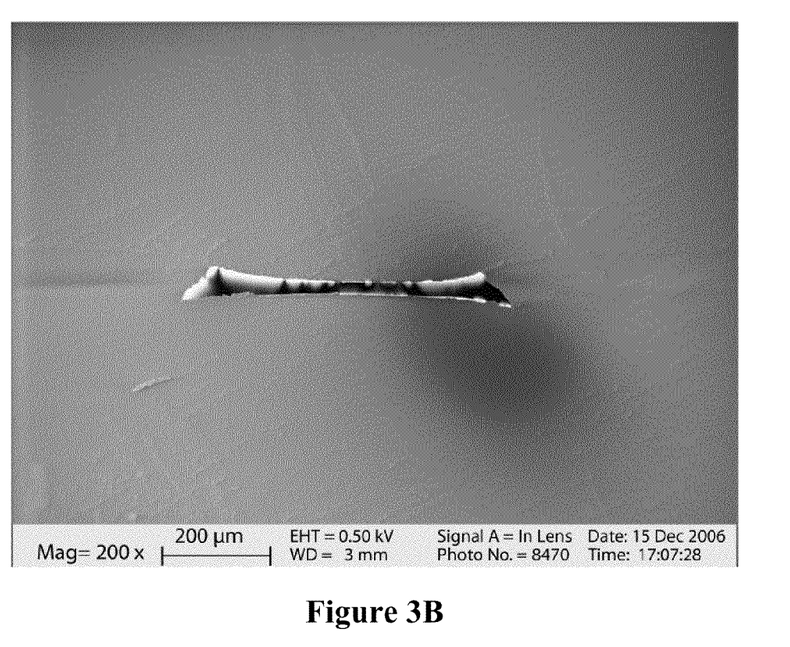

It should be noted that bond strengths of 0.06 mJ/cm² at 25° C. and around 10 mJ/cm² at 50° C. have been reported for COC following optimized O$_2$ plasma activation, while low-temperature bonding of PMMA was found to be unaffected by plasma treatment (Kettner, P. et al. (2006) "*New Results on Plasma Activated Bonding of Imprinted Polymer Features for Bio MEMS Applications*," J. Phys.:Conf. Series 34:65-71). Thus, in addition to the simplicity and cost advantages of UV/O$_3$ over plasma treatment for COC substrates, UV/O$_3$ treatment offers the additional benefit of direct compatibility with low temperature bonding of PMMA microfluidic devices. An electron micrographs of a 500 µm wide and 180 µm deep PMMA microchannel bonded at 60° C. following a 24 min UV/O$_3$ treatment is shown in FIG. 3A. Despite the extreme width of the channel, no deformation of the channel walls is evident. In contrast, the microchannel fabricated with the same initial dimensions and bonded at 100° C. without surface treatment in FIG. 3B suffers from severe wall deformation and channel collapse. Other than the surface treatment, both channels were bonded using identical parameters. As revealed from the bond strength plot (FIG. 2), the treated chip bonded at only 60° C. offers a higher bond strength than the untreated chip bonded slightly above its glass transition temperature. While even higher bond temperatures could improve bond strength for the untreated PMMA, the resulting channel deformation poses a substantial limitation on the range of channel geometries which can be successfully bonded without UV/O$_3$ surface modification.

Surface Stability. While UV/O$_3$ treatment can enable low temperature bonding of thermoplastic substrates, the effects of UV/O$_3$ exposure on microchannel wall chemistry, and ultimately on device performance, must also be considered. For example, enhanced hydrophilicity can enable simple channel priming via surface tension driven wetting, while charged surface groups generated by UV/O₃ exposure may result in undesirable electrostatic interactions with analyte molecules and excessive or poorly controlled electroosmotic flow (EOF). Characterization of the oxidized surfaces is needed to understand whether desirable surface behavior can be retained, or undesirable behavior eliminated, after exposing the treated surfaces to various solutions.

Figure 4:
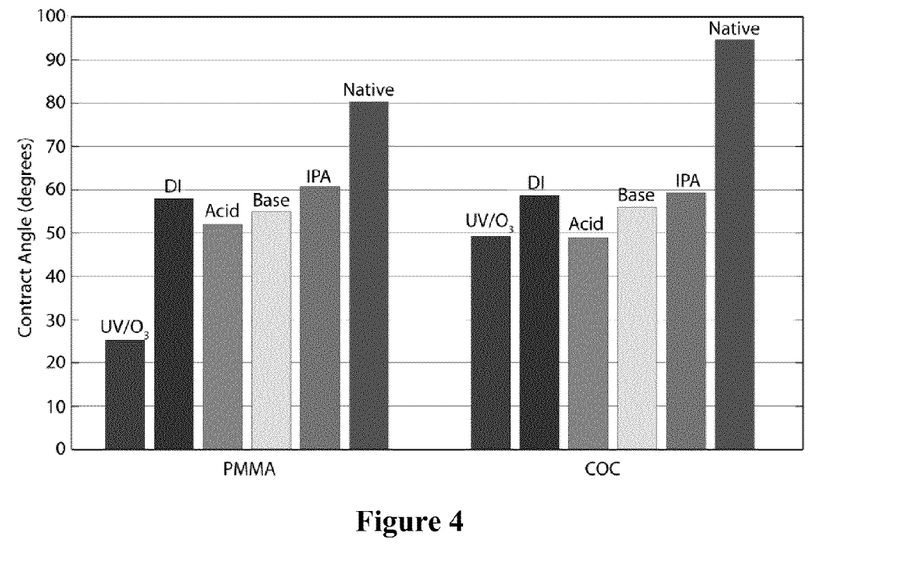
FIG. 4 shows the sessile water contact angle on PMMA and COC following $UV/O_3$ treatment only, and $UV/O_3$ treatment followed by 2 min. soaking in: DI water (pH 7), acetic acid (pH3), NaOH (pH 10) or IPA. Contact angles for native surfaces are shown for reference.

It has been suggested that UV/O₃ hydrophilization of polymers may not be appropriate for applications where the surface is subjected to washing, since a substantial portion of the generated surface charge is due to low molecular weight oxidized material on the surface which can be lost by dissolution (Johansson, B. L. et al. (2002) "*Characterization Of Air Plasma-Treated Polymer Surfaces By ESCA And Contact Angle Measurements For Optimization Of Surface Stability And Cell Growth*," J. Appl. Polymer Sci. 86:2618-2625). For example, poly(ethyleneterephthalate) (PET) and polystyrene (PS) films hydrophilized by UV/O₃ treatment have been observed to lose substantial portions of their surface charge following a short 5 min surface wash in DI water (Teare, D. O. H. et al. (2000) "*Surface Characterization And Ageing Of Ultraviolet-Ozone-Treated Polymers Using Atomic Force Microscopy And X-Ray Photoelectron Spectroscopy*," Surf. Interface Anal. 29:276-283). To explore this issue for PMMA and COC microfluidic substrates, chips exposed to a 24 minute UV/O₃ dose were soaked in de-ionized (DI) water (pH 7), acetic acid (pH 3), NaOH (pH 10), and 2-propanol (IPA). Individual sets of 3 chips for each case were submerged for 2 minutes in the respective solutions and dried under a gentle N₂ stream prior to sessile contact angle measurements. The resulting contact angles are shown in FIG. 4. From this plot, it is interesting to note that despite the substantially lower contact angle for PMMA compared to COC following the initial UV/O₃ treatment, both materials reverted to around 55° after solvent exposure, with the acidic solution resulting in the lowest value, and IPA resulting in the highest value in each case. Longer soaking times of 4 hours in all solutions did not noticeably alter the contact angles for either material. This result stands in contrast to previous work on PMMA surface modification using UV irradiation without the explicit generation of ozone, in which complete reversion of water contact angles was observed following IPA rinsing (Wei, S. et al. (2005) "*Photochemically Patterned Poly(methyl methacrylate) Surfaces Used in the Fabrication of Microanalytical Devices*," J. Phys. Chem. B 109:16988-16996). This result indicates that UV/O₃ treatment generates a more stable oxidized surface. Overall, the initial density of oxidized surface groups following UV/O₃ treatment can be reduced by solvent interactions, but with the final surfaces retaining a substantial degree of hydrophilicity even after long term exposure to a range of solvent conditions.

XPS Analysis. During UV/O₃ exposure, the UV light at 253.7 nm generates free radicals on the polymer surface which further react with oxygen, resulting in oxygen-containing surface species such as carboxyl, hydroxyl, or peroxide groups (Wei, S. et al. (2005) "*Photochemically Patterned Poly(methyl methacrylate) Surfaces Used in the Fabrication of Microanalytical Devices*," J. Phys. Chem. B 109:16988-16996). Using XPS to interrogate the atomic composition of the top polymer layer, the degree to which oxygen is introduced into the surfaces was evaluated following 24 minutes UV/O₃ treatments. Curve fitting of the raw XPS data was performed using Kratos Vision software to determine the relative atomic concentrations of surface C and 0, with the results summarized in Table 2. The 24 minute UV/O₃ exposure was found to increase surface oxygen by 51% for PMMA and 205% for COC, indicating the generation of substantial oxygen-containing functional groups on the polymer surfaces. Treated chips rinsed in DI water for 4 hours were also measured to evaluate the degree to which charged surface groups were lost by dissolution. The XPS data suggest no loss of oxygen-containing species for COC, but a 37% decrease for PMMA. This trend is generally consistent with the observation from FIG. 4 that soaking treated COC does not significantly change the water contact angle, while 24 minute treated PMMA surfaces exhibit a 36% lower contact angle than the same surfaces after a 4 hour DI water soak.

TABLE 2

XPS Analysis Of Elemental Composition For PMMA And COC Surfaces Following Different Treatment Conditions*

| Material | Surface | C1s Atom % | O1s Atom % | C/O Ratio | O %Δ |
|---|---|---|---|---|---|
| PMMA | None | 75.5 | 24.5 | 3.1 | — |
|  | UV/O₃ | 63.1 | 36.9 | 1.7 | 51 |
|  | UV/O₃ + DI | 68.0 | 32.0 | 2.1 | 32 |
| COC | None | 94.5 | 5.5 | 17.3 | — |
|  | UV/O₃ | 83.2 | 16.8 | 5.0 | 205 |
|  | UV/O₃ + DI | 81.7 | 18.3 | 4.5 | 233 |

*Percent change in oxygen is measured relative to the untreated surfaces

Figure 5:
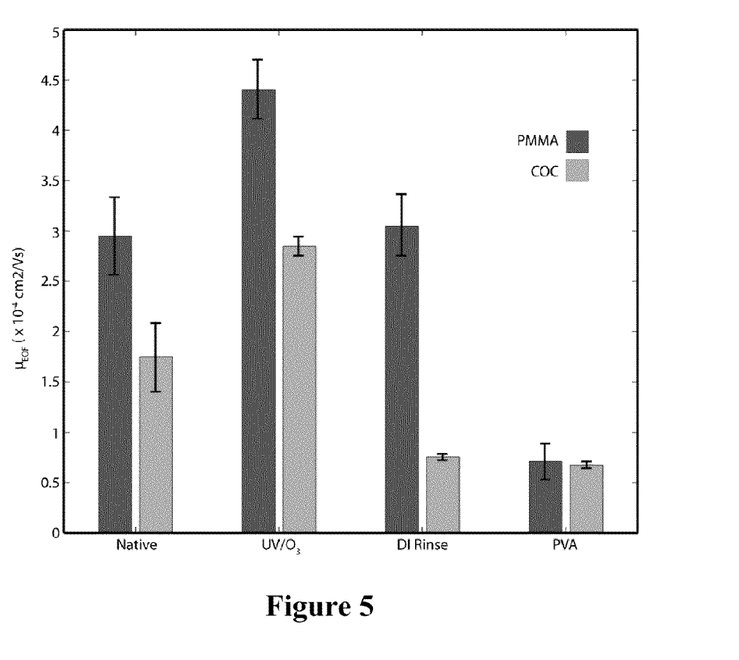
FIG. 5 shows electroosmotic mobility measurements at pH 9 for native PMMA and COC substrates, and the same substrates following a surface treatment sequence of 24 min. $UV/O_3$ exposure, 2 min. DI water rinsing, and PVA coating.

Electroosmotic Flow Characterization. The observed reduction in hydrophilicity following solvent rinsing suggests a corresponding reduction in charged groups from the microchannel walls. Since zeta potential and electroosmotic mobility ($\mu_{EOF}$) are both functions of surface charge, UV/O₃ treatment is not suitable as a method to achieve strong and stable EOF in thermoplastic devices. However, for applications where EOF is not desirable, this is a positive result. To verify this prediction, measurements of $\mu_{EOF}$ were performed at pH 9 in microchannels fabricated from native PMMA and COC, substrates treated with UV/O₃ for 10 minutes, and treated substrates which were then subjected to a DI water soak for 24 hours. As shown in FIG. 5, the initial UV/O₃ treatment increases the average value of $\mu_{EOF}$ by at least 50% for both materials due to the higher charge on the oxidized surface. However, after soaking the chips in DI water, the electroosmotic mobility is greatly reduced, returning to near the native value for PMMA, and below the native value for COC.

While solvent rinsing can reduce the surface charge of UV/O₃ treated thermoplastics, it is also possible to take advantage of the unrinsed surfaces for further modifications. Unlike silica, which offers a native hydrophilic surface with well-characterized methods for its modification and derivitization, thermoplastics are generally non-polar and hydrophobic (Deng, J. P. Y. et al. (2001) "*Surface Photografting Polymerization Of Vinyl Acetate (VAc), Maleic Anhydride (MAH), And Their Charge Transfer Complex (CTC). III. VAc(3)*," J. Appl. Polym. Sci. 80:1426-1433) and thus suffer from poor biocompatibility including nonspecific analyte adhesion due to hydrophobic interactions (Currie, E. P. N. et al. (2003) "*Tethered Polymer Chains. Surface Chemistry And Their Impact On Colloidal And Surface Properties*," Adv. Colloid Interface Sci. 100-102:205-265). While UV/O₃ oxidation can produce hydrophilic polymer surfaces, the resulting charged groups on the microchannel walls can lead to electrostatic interactions with analyte molecules, resulting in sample loss and peak dispersion during biomolecular separations in addition to the increased EOF demonstrated in FIG. 5. As an additional test, $\mu_{EOF}$ was measured for PMMA and COC chips treated with UV/O₃ for 10 minutes followed by bonding at 90° C. and PVA coating. Shah et al. reported the use of PVA as a static coating for high-resolution DNA separations in PMMA microfluidics following an initial UV/O$_3$ surface treatment to improve PVA/wall interactions (Shah, J. J. et al. (2006) "*Surface Modification Of Poly(Methyl Methacrylate) For Improved Adsorption Of Wall Coating Polymers For Microchip Electrophoresis*," Electrophoresis 27:3788-3796), enabling the formation of a stable hydrophilic coating with low biomolecular adsorption, it can also substantially mask the polymer surface charge for reduced wall/analyte electrostatic interactions and electroosmotic flow. The presently reported measurements, also shown in FIG. 5, support this observation, with electroosmotic mobilities of $\mu_{EOF} < 8 \times 10^{-5}$ cm$^2$/Vs exhibited for both PMMA and COC following PVA coating. Control experiments using PVA-coated chips without UV/O$_3$ treatment exhibited virtually identical electroosmotic mobilities as the native polymers before PVA coating, further emphasizing the utility of UV/O$_3$ surface activation.

In sum, relationships between UV dose and surface hydrophilicity and bond strength were explored as was the effect UV/O$_3$ treatment on electroosmotic flow in order to evaluate the post-bonding effects of UV/O$_3$ treatment on microfluidic device performance. The. UV/O$_3$ surface treatment was found to be an effective method for low temperature polymer microfluidic substrate bonding. Oxidized surface chemistry has been evaluated as a means for measuring the stability of surface charge following exposure to common solvent conditions.

All publications and patents mentioned in this specification are herein incorporated by reference to the same extent as if each individual publication or patent application was specifically and individually indicated to be incorporated by reference in its entirety. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A method for bonding a first surface of a polymeric plastic to a second surface, wherein said method comprises:
    (A) treating at least one of said surfaces with short wavelength UV light and in the presence of oxygen gas under conditions sufficient to generate a controlled concentration of oxygen and oxygen radicals;
    (B) permitting said generated oxygen radicals to oxidize said at least one of said surfaces; and
    (C) contacting said surfaces together to thereby bond them to one another, wherein bonding occurs at a temperature below a glass transition temperature of said surfaces.

2. The method of claim 1, wherein both said first and said second surfaces are treated with said UV light.

3. The method of claim 1, wherein said polymeric plastic is a polymeric thermoplastic and said step of treating is below the glass transition temperature of said polymeric thermoplastic.

4. The method of claim 1, wherein both said first and said second surfaces are surfaces of polymeric thermoplastic.

5. The method of claim 4, wherein the polymeric plastic of both said first and said second surfaces is the same polymeric thermoplastic.

6. The method of claim 3 wherein said polymeric thermoplastic is poly-(methyl methacrylate).

7. The method of claim 6, wherein said temperature is from about 25° C. to about 95° C.

8. The method of claim 3, wherein said polymeric thermoplastic is cyclic olefin copolymer.

9. The method of claim 8, wherein said temperature is from about 25° C. to about 100° C.

10. A substrate comprising a thermoplastic polymer having a first surface bonded to a contacting second surface, wherein said bonding was accomplished through a method which comprises:
    (A) treating said first or second surface with short wavelength UV light and in the presence of oxygen gas under conditions sufficient to generate a controlled concentration of oxygen and oxygen radicals; and
    (B) permitting said generated oxygen radicals to oxidize said first or second surface, and thereby facilitate the bonding of said first surface to said second surface, wherein bonding occurs at a temperature below a glass transition temperature of said first and second surfaces;
    wherein the bond between said surfaces is at least 10 fold greater than the maximal bond strength exhibited between said surfaces in the absence of said UV treatment.

11. The substrate of claim 10, wherein the bond between said surfaces is at least 100 fold greater than the maximal bond strength exhibited between said surfaces in the absence of said UV treatment.

12. The substrate of claim 10, wherein both said first and second surfaces are treated with said UV light.

13. The substrate of claim 10, wherein both said first and said second surfaces are surfaces of polymeric thermoplastic.

14. The substrate of claim 13, wherein the polymeric thermoplastic of both said first and said second surfaces is the same polymeric thermoplastic.

15. The substrate of claim 10, wherein said polymeric thermoplastic is poly-(methyl methacrylate).

16. The substrate of claim 15, wherein said bond strength is greater than 300 mJ/cm$^2$.

17. The substrate of claim 10, wherein said polymeric thermoplastic is cyclic olefin copolymer.

18. The substrate of claim 17, wherein said bond strength is greater than 50 mJ/cm$^2$.

19. The substrate of claim 10, wherein said substrate is a microfluidic system comprising an interconnected reservoir and microchannel.

20. The substrate of claim 19, wherein said microfluidic system conducts a preparative or analytical chemical reaction.

21. The method of claim 1, wherein the concentration of oxygen within said surface increases by at least about 50% during said step of permitting said generated oxygen radicals to oxidize said bonding surface.

\* \* \* \* \*